Oct. 7, 1969  D. L. GEISELMAN  3,471,121
BUTTERFLY VALVE
Filed June 20, 1966
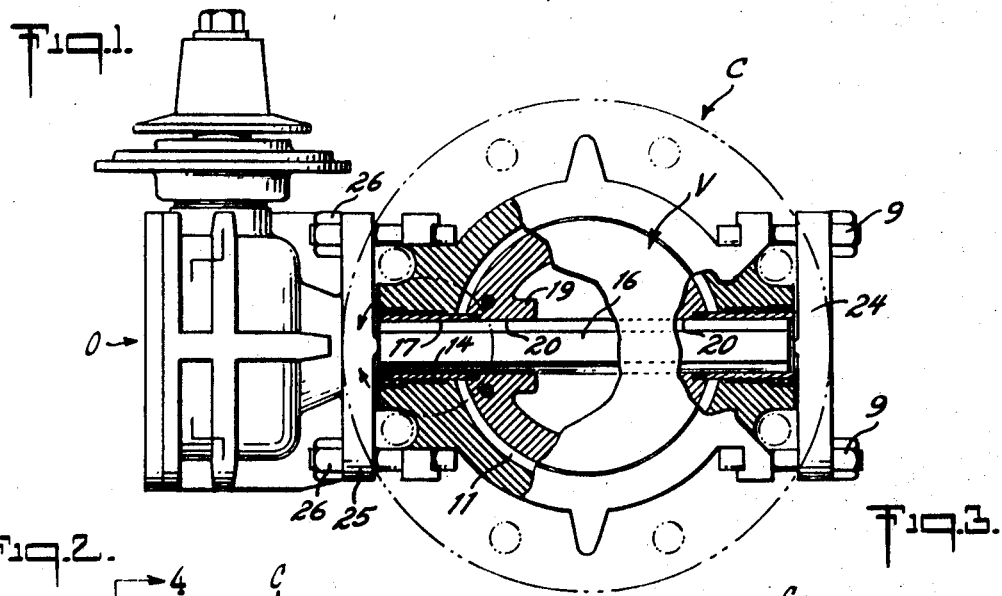
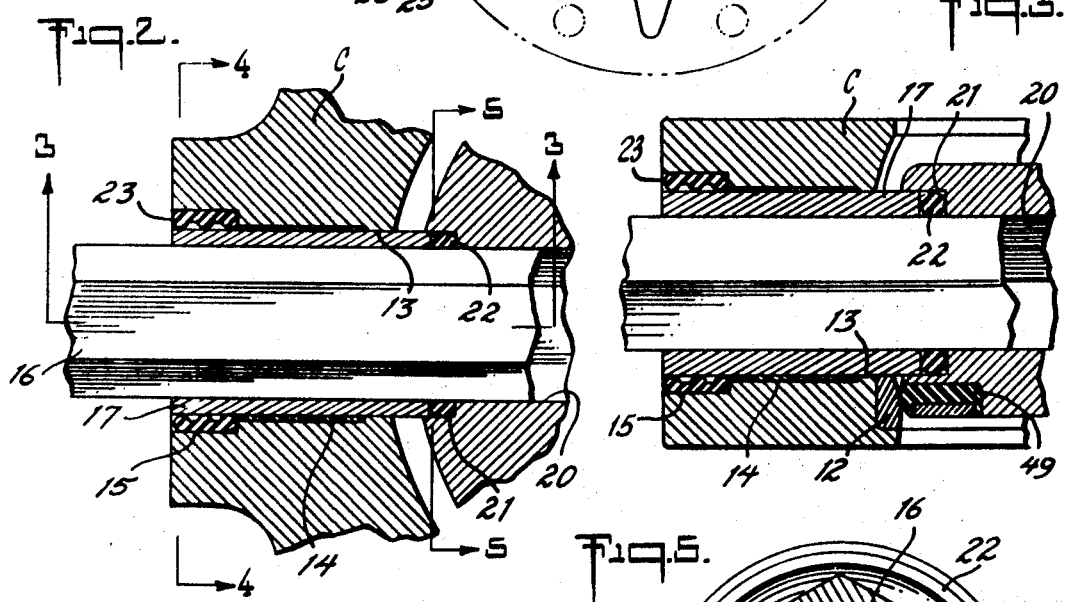
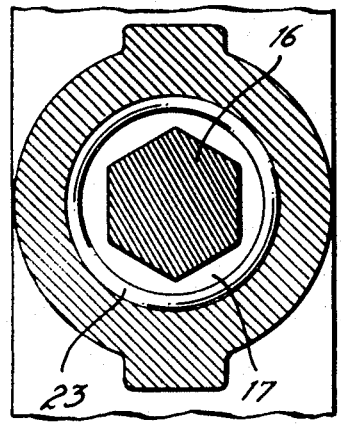
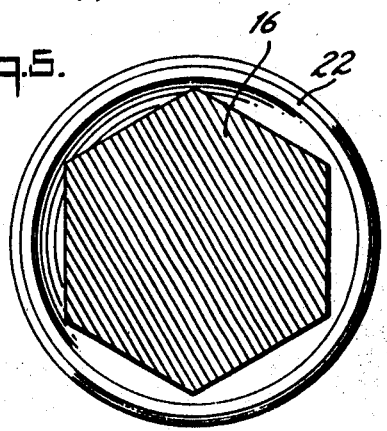
INVENTOR
DONALD L. GEISELMAN
ATTORNEY

United States Patent Office 3,471,121
Patented Oct. 7, 1969

3,471,121
BUTTERFLY VALVE
Donald L. Geiselman, Bradford, Pa., assignor to Dresser Industries, Inc., Dallas, Tex., a corporation of Delaware
Continuation-in-part of application Ser. No. 513,772, Dec. 14, 1965. This application June 20, 1966, Ser. No. 558,963
Int. Cl. F16k 1/226, 25/04
U.S. Cl. 251—308         7 Claims

ABSTRACT OF THE DISCLOSURE

A butterfly valve suitable for high torque operation and corrosive line service. The valve utilizes a relatively low cost, corrosion susceptible shaft of high yield strength mounted for rotation and secured interlocked with the vane. A corrosion resistant sleeve is interlocked for rotation with the shaft which it encloses generally juxtaposed to the vane and a stationary seal between the sleeve and vane maintains the shaft protected from line content exposure.

---

This invention relates to butterfly valves, and resides more specifically in an improved and more economical main drive shaft assembly.

This application is a continuation-in-part of my copending application Ser. No. 513,772, filed Dec. 14, 1965, now abandoned.

The shaft assembly which mounts the vane in a large butterfly valve must be quite massive because of the vary high torque required to sustain and operate the vane in the fluid stream. A second major requirement, and one that is not compatible with the needs of the other, is that the shaft be resistant to corrosion. Stainless steel, for example, is not only much more expensive than plain carbon steel, but is also considerably weaker in yield strength. Hence the shaft assembly has necessarily been both a larger and more expensive component of the typical commercial butterfly valve in the larger size range. Heretofore there has been no known design whereby a cheaper and stronger plain carbon steel central shaft could be completely isolated from the corrosive fluid medium or be otherwise protected against corrosion. In the prior art there have been various arrangements of seals and non-corrosive sleeves sheathing a central shaft. These, however, have been inoperative in overall principle because, among other reasons, they attempted to maintain a fluid-tight seal between relatively moving parts, which is not generally possible.

It is the principal object of this invention to provide a butterfly valve having a cheaper and stronger but nevertheless corrosion-resistant central shaft assembly. More specifically, it is an object to enclose a carbon inner steel shaft within corrosion-resistant sleeves and to maintain an effective seal against exposure of the inner shaft to corrosive line fluid.

A further object of this invention is to provide a butterfly valve having a longer service life by virtue of minimizing the wearing of parts, and which is so constructed that it can be easily serviced in the field.

The above objects are attained in accordance with this invention in a shaft and sleeve assembly wherein stationary rather than relatively moveable seals are employed. A carbon steel driving shaft extends centrally through the vane and its ends at opposite sides of the vane are protected by stainless steel bearing sleeves by which it is journalled in the valve housing. These sleeves are fixed relative to the shaft and vane, and a stationary (or "static") seal between them absolutely prevents seepage of line fluid into contact with the inner shaft of cheaper but stronger steel. In the specific preferred embodiment disclosed herein, the shaft, sleeves and vane are relatively fixed together by virtue of a noncircular cross-section (e.g., hexagonal) of the shaft. This has the advantage that there is no need for machining keys, through pins or the like, and the further advantage that the valve can very easily be serviced and have parts interchanged in the field.

Further objects, advantages and details will become evident from the following description when read in conjunction with the accompanying drawings, in which:

FIGURE 1 is an end view, partly broken away and in section, of a complete valve embodying this invention;

FIGURE 2 is an enlarged axial shaft section of the portion indicated by the circle "2" in FIGURE 1;

FIGURE 3 is an enlarged horizontal axial shaft section taken as indicated by lines 3—3 in FIGURE 2;

FIGURE 4 is a cross-section of the shaft, taken as indicated by lines 4—4 in FIGURE 2;

FIGURE 5 is another cross-sectional view taken as indicated by lines 5—5 in FIGURE 2.

Referring to FIGURE 1, the valve housing or casing is generally referred to by the letter C. A vane generally referred to as V is rotatably mounted on a shaft 16, which is driven by a valve operating unit generally referred to as O. The valve operating mechanism comprising the unit O is fully disclosed in my aforementioned copending application Ser. No. 513,772, and forms no part of the present invention. Likewise, the vane V embodies an adjustable sealing gasket 11 which is the subject matter of my concurrently filed copending application Ser. No. 558,962, filed June 20, 1966, and entitled "Sealing Means for Butterfly Valve."

The oppositely aligned bores in which the composite shaft and sleeve assembly is journalled are indicated at 13. At one side of the valve the bore 13 is capped by a cover plate 24 secured by bolts 9; at the other side, the shaft 16 extends through to the operating unit O, which likewise has an integral plate 25 secured to the housing C by bolts 26. The shaft 16 is preferably noncircular in cross-section for reasons elaborated hereafter, and in the specifically disclosed embodiment this noncircular shape is a hexagon. The vane V is a hollow metal casting with internal hubs 19 through which there are formed oppositely aligned bores each having a snug sliding fit with the hexagonal shaft 16. The periphery of the vane V has secured thereto an annular rubber gasket 49 (FIGURE 3) which seals against a stationary stainless steel ring 12 incorporated in the housing, all as described in said copending application Ser. No. 558,962. At the entrance to each hexagonal bore 20 in the vane there is bored a round gasket recess 21 which receives a resilient sealing ring 22.

In the housing C, the bores 13 accommodate cylindrical "Teflon" antifriction bearings 14. A corrosion resistant sleeve 17 having a cylindrical exterior and a hexagonal interior is slipped onto each side of the shaft 16 in close-fitting relation therewith and freely journals the composite shaft assembly and vane for rotational movement. Stainless steel is an example of a corrosion resistant material which may comprise these sleeves 17. Packing rings 23 are tightly confined within counterbores 15 as shown. When the cover plate 24 and operator housing plate 25 are bolted tightly against the valve housing, the packing rings 23 are compressed and the sleeves 17 thrust the gasket rings 22 against the respective recesses 21 in the vane. The stainless steel bearing sleeves 17, the central steel driving shaft 16 and the vane V move as a single unit, and hence there is no relative motion to impose wear on the gaskets 22 or otherwise to impair their complete sealing effectiveness. The shaft 16 is thus isolated indefinitely from exposure to the line fluid, and therefore it can comprise a stronger but not corrosive resistant steel. The economy effected by this measure can be a very substantial percentage of present overall manufacturing cost, to the point that a butterfly valve can be competitive in price with the large gate valves for waterworks service. Another significant feature, as previously mentioned, is that the entire butterfly valve can be disassembled simply by removing the operator O and pulling the shaft 16.

While the preferred embodiment of the invention has been described with respect to a carbon steel shaft it will be understood that it is equally applicable to valves employing other metals of relatively high yield strength and poor corrosion resistance, such as ductile iron, malleable iron or the like for the central shaft.

What is claimed is:

1. In a butterfly valve including a housing wall defining a passage for the flow of fluid, a bearing in said wall, a vane operable to open and close said passage to fluid flow and providing axially aligned bores through which to receive a supporting shaft and a rotatable supporting shaft extending through said vane bores to operably support said vane in said passage, wherein the improvement comprises:
    (a) a cylindrical and relatively corrosion-resistant sleeve rotatable in said bearing and enclosing said shaft generally juxtaposed and coaxially with said vane;
    (b) said shaft, sleeve and vane being secured for conjoint rotation of each with the other by means of complementary interlocking fits therebetween; and
    (c) seal means axially interposed between the relatively unrotatable end of said sleeve and the vane providing a relatively stationary seal therebetween to protect the shaft thereat against exposure to fluid contents of said housing.

2. A valve according to claim 1 wherein said shaft is carbon steel.

3. In the improvement according to claim 2, wherein said shaft is of hexagonal cross-section.

4. In the improvement according to claim 1, includnig a packing ring between said sleeve and the wall of the housing at the outer end of said bearing.

5. In the improvement according to claim 1, wherein said seal means comprises at least one gasket ring between the sleeve and an annular recess formed encircling the shaft at the side of the vane.

6. In a butterfly valve including opposite housing walls defining a passage for the flow of fluid, a bearing in each of said walls coaxially aligned, a vane operable to open and close said passage to fluid flow and providing axially aligned bores through which to receive a supporting shaft, and a rotatable supporting shaft of relatively high yield strength and poor resistance to corrosion extending through said vane bores to operably support said vane in said passage, wherein the improvement comprises:
    (a) a cylindrical and relatively corrosion-resistant sleeve rotatable in each of said bearings, each sleeve enclosing the shaft thereat generally juxtaposed and coaxially with said vane;
    (b) said shaft, sleeves and vane being secured for conjoint rotation of each with the other by means of complementary interlocking fits therebetween; and
    (c) seal means axially interposed between the relatively unrotatable end of each sleeve and the vane providing a relatively stationary seal therebetween to protect the shaft thereat against exposure to fluid contents of said housing.

7. In the improvement according to claim 6, wherein said seal means comprise gasket rings between an end of each sleeve and an annular recess formed in each side of the vane around the shaft.

References Cited

UNITED STATES PATENTS

| | | | |
|---|---|---|---|
| 2,853,267 | 9/1958 | Herren et al. | 251—308 XR |
| 2,883,149 | 4/1959 | Fiorentini | 251—308 XR |
| 2,913,218 | 11/1959 | Broz | 251—307 XR |
| 3,029,063 | 4/1962 | Moen | 251—306 |
| 3,143,132 | 8/1964 | Pangburn | 251—306 XR |
| 3,341,170 | 9/1967 | Housworth | 251—306 |
| 3,376,014 | 4/1968 | Buckley et al. | 137—375 XR |
| 1,858,587 | 5/1932 | Grant | 251—306 |

FOREIGN PATENTS

| | | |
|---|---|---|
| 966,300 | 7/1957 | Germany. |

HENRY T. KLINKSIEK, Primary Examiner